Patented Feb. 16, 1932

1,845,355

UNITED STATES PATENT OFFICE

EDWARD E. SORENSEN, OF DETROIT, MICHIGAN, ASSIGNOR, BY DIRECT AND MESNE ASSIGNMENTS, TO PAUL F. SCHOLBE, OF DETROIT, MICHIGAN

NONINFLAMMABLE REFRIGERANT

No Drawing. Application filed August 10, 1928, Serial No. 298,879. Renewed October 7, 1931.

This invention relates to a non-inflammable refrigerant and particularly a non-inflammable refrigerant for use in refrigerating systems of the compression expansion type.

Various forms of refrigerants have heretofore been used commercially, such as ammonia, sulphur dioxide, and methyl chloride and while these refrigerants have proven more or less satisfactory and have various individual features which make them desirable, they have practically all been objectionable, due to their inflammability and their corrosive action on the metal parts of the refrigerating systems. Other objections inherent in such refrigerants include the necessary high operating pressure in the highside in addition to lubricating problems.

It is the object of the present discovery to provide a refrigerant which, in general, possesses the many advantages of refrigerants formerly used, such as methyl chloride and sulphur dioxide, and which at the same time eliminates a great number of the characteristics which have made these refrigerants objectionable.

I have discovered that a refrigerant made up of forty parts of ethyl chloride ($C_2H_5Cl$) by weight and sixty parts of ethyl bromide ($C_2H_5Br$) by weight has very striking properties which make it very much more desirable, particularly under certain conditions, than the standard inflammable refrigerants heretofore used.

For instance, the addition of the ethyl bromide to ethyl chloride in substantially the proportions stated results in a refrigerant which is not only positively non-inflammable, but which is also a safe gas for use in refrigerating systems of the expansion type. Refrigerating units for water coolers and the like are being installed in office buildings and other places where the rigid restrictions practically prevent the use of inflammable refrigerants. It will be obvious that under such conditions the use of the present non-inflammable refrigerant will be highly desirable.

Furthermore, I find that the above described refrigerant is non-corrosive under any conditions and is positively non-injurious in case it escapes from the refrigerating system.

A still further very important feature is that a refrigerant formed by a mixture of ethyl bromide and ethyl chloride under the approximate above proportions is relatively heavy and oily, and in actual operation requires only a relatively low compression pressure in the highside. I have found that my refrigerant liquefies at a pressure of approximately fifty pounds or less at 60 degrees F., and that in the lowside the normal pressure is from five to eight inches of vacuum.

I have found that a variation in the above proportions decreases the advantageous properties of the refrigerant, but it will be understood that I do not desire to be limited to the exact proportions stated, but desire it to be understood that measurably good results can be obtained with some variation of the above proportions and the quality of the ingredients.

It will be understood that the present refrigerant is equally well adaptable to both the direct expansion type and the flooded type of refrigerating units.

What I claim is:

1. A new product for use as a refrigerant, comprising ethyl bromide and ethyl chloride.

2. A new product for use as a refrigerant, comprising substantially sixty parts by weight of ethyl bromide and forty parts by weight of ethyl chloride.

3. A new product for use as a refrigerant, comprising a refrigerant of the chloride group, and ethyl bromide.

4. A new product for use as a refrigerant, comprising a refrigerant of the chloride group, and ethyl bromide, the proportion of ethyl bromide in the mixture being greater by weight than the chloride.

In testimony whereof I affix my signature.

EDWARD E. SORENSEN.